June 16, 1953 — A. R. DE BURGH — 2,642,176

CONVEYER SYSTEM

Filed Sept. 2, 1947 — 5 Sheets-Sheet 1

INVENTOR.
Albert R. DeBurgh
BY
Robt. D. Pearson
ATTORNEY.

June 16, 1953     A. R. DE BURGH     2,642,176
CONVEYER SYSTEM

Filed Sept. 2, 1947     5 Sheets-Sheet 2

INVENTOR.
Albert R. DeBurgh
BY
Robt. W. Pearson
ATTORNEY.

June 16, 1953    A. R. DE BURGH    2,642,176
CONVEYER SYSTEM
Filed Sept. 2, 1947    5 Sheets-Sheet 3

INVENTOR.
Albert R. DeBurgh
BY
Robt. W. Pearson
ATTORNEY.

June 16, 1953  A. R. DE BURGH  2,642,176
CONVEYER SYSTEM
Filed Sept. 2, 1947
5 Sheets-Sheet 4

INVENTOR.
Albert R. DeBurgh
BY
Robt. D. Pearson
ATTORNEY.

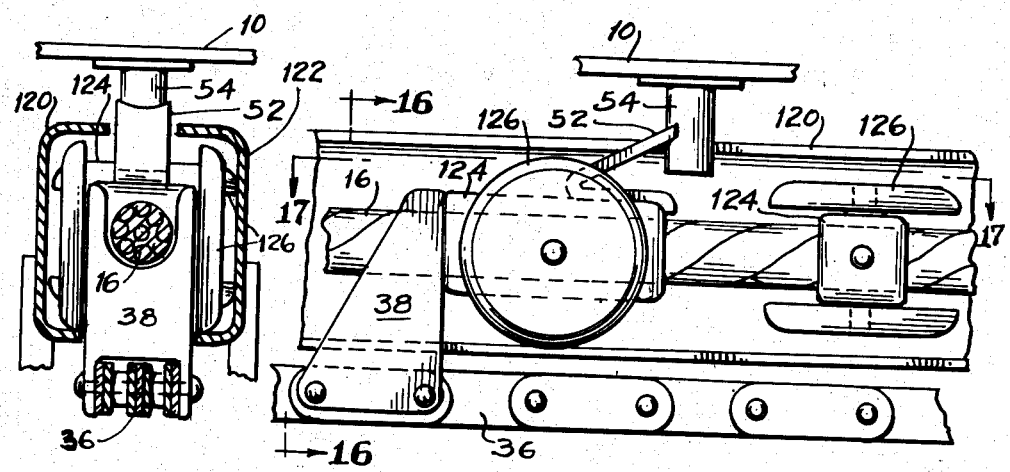

Patented June 16, 1953

2,642,176

UNITED STATES PATENT OFFICE 2,642,176

CONVEYER SYSTEM

Albert R. De Burgh, Redondo Beach, Calif.

Application September 2, 1947, Serial No. 771,587

15 Claims. (Cl. 198—135)

This invention relates to conveyor systems, and especially to conveyors as employed in the manufacture, assembly, finishing and packing of various articles of manufacture, and it has reference more particularly to an improved method of utilizing conveyors and conveyor accessories for a more expeditious and economical manufacture or finishing of articles of furniture, or for the assembly or manufacture and finishing of other articles which require that a succession of operations or treatments be performed thereon; such, for example, as in the finishing of articles of furniture, where it is required that they be sanded, puttied, sanded, stained, wiped, dried, sealed, dried again, sanded again, shaded, decorated, lacquered and/or varnished, finally dried, then wrapped and packed.

A conveyor system for such purpose was described and claimed in my U. S. Patent 2,317,675. The features of the present invention may be employed in conjunction with that system but are not limited to such utilization.

The present invention comprises an arrangement of elements whereby a conveying cable may be intermittently moved along its course so as to convey connected articles to successive stations, with rest periods at each station to allow for treating or handling of such articles. The cable is moved by a continuously traveling drive belt which is provided with means for periodically connecting and disconnecting it with the cable, which means may be set to obtain predetermined periods of travel and rest of the cable and the articles which it is moving.

The invention provides several forms of cable attachment blocks as well as a number of co-operating drive means and is particularly effective in directing the conveying cable around short turns or even reversing its direction.

Other objects and advantages of the invention will be apparent from the following description and claims, the novelty consisting in the features of construction, combination of parts, the unique relations of the members and the relative proportioning, disposition, and operation thereof, all as more completely outlined herein and particularly pointed out in the appended claims.

In the drawings, which form part of the present specification:

Figure 15 is a side, elevational view of still another construction of guideway and cable block with the nearer wall of the guide housing removed;

Figure 16 is a vertical, sectional view, partly in elevation, taken thru the assembly of Figure 15 along the line 16—16; and Figure 17 is a horizontal, sectional view of the assembly of Figure 15 as seen along the line 17—17.

Figure 2:
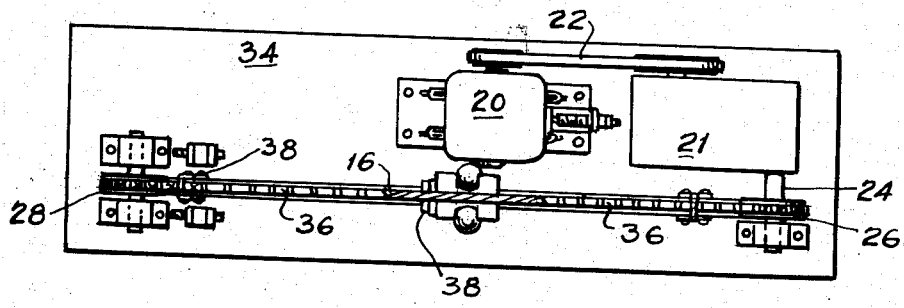
Figure 2 is a plan view of the lower portion of the unit as seen along the line 2—2 of Figure 1.
Figure 1:
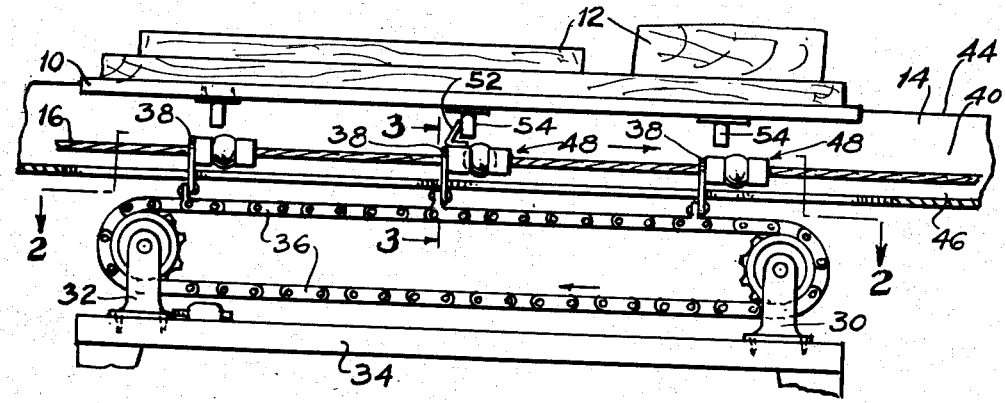
Figure 1 is a longitudinal, vertical, sectional view, partly in elevation, taken thru a unit of my conveyor system.
Figure 3:
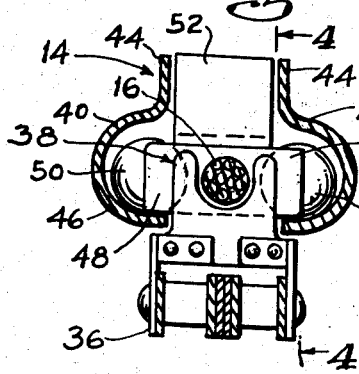
Figure 3 is a transverse, vertical, sectional view taken thru the guideway along the line 3—3 of Figure 1 and showing a cable block disposed therein.
Figure 4:
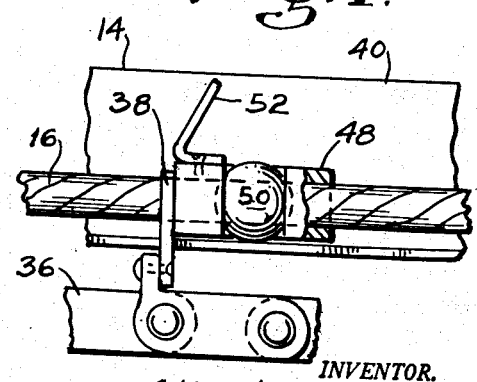
Figure 4 is a side elevational view of the cable block as seen along the line 4—4 of Figure 3.

As illustrated, there is provided a series of elongated, longitudinally movable, generally flat pallets 10 each adapted to support one or more work pieces 12 upon its upper surface, the pallets being mounted in a suitable guideway 14 which may be tortuous or straight as required to convey each pallet past successive work stations. A cable 16 forms an endless belt which is disposed along the length of the guideway. The successive pallets 10, which are generally spaced apart along the guideway, are supported from beneath by castors or rollers 18 (Figure 5) of any suitable type, mounted on a supporting frame 19 on either side of the guideway.

At one or more successive locations along the guideway there is fixedly mounted a motor 20 which is connected to suitable reduction gears 21 by a drive belt 22, the reduction gears in turn operating a drive shaft 24 of a sprocket wheel 26. This sprocket wheel, as well as a correspondingly shaped idler sprocket 28, are journalled in upright supporting brackets 30 and 32 respectively, which brackets are fixedly mounted upon a substructure 34 which serves also to support the motor and reduction gears thereon. An endless sprocket chain 36 is disposed about the two sprocket wheels so as to be driven by the forward wheel 26, and is located parallel to the cable and guideway immediately above.

A number of the links or segments of the sprocket chain, at intervals along its length, have affixed thereto an outwardly extending, forked engaging element or pusher 38 which is adapted to project into a slot in the bottom of the guideway 14 so as to receive the cable 16 between its prongs. The guideway 14 is formed by a pair of complementary curved side walls 40 and 42 laterally spaced apart with a continuous longitudinal slot left between their top edges. Each side wall is provided with an upper, vertically extending portion 44 disposed parallel to the corresponding portion of the other side wall and a dependent, outwardly bowed semi-circular section 46 disposed so as to form a raceway jointly with the opposite side wall, in which channel or raceway the cable 16 is disposed in the center.

Fixedly mounted on the cable at spaced positions along its length are a series of guide elements or cable blocks 48, each block being provided with a ball socket along outer side faces so as to seat therein a ball-bearing 50, the pair of balls for each block being disposed in transverse alignment, with their outer portions disposed in rolling registration with the opposite inner curved faces 46 of the guideway. Fixed to the top surface of various blocks is an upstanding, forwardly angularly disposed lug 52 which extends transversely between the vertical neck portions 44 of the opposite guide walls.

A series of downwardly extending pins 54 are mounted along the bottom keel of each pallet 10 so as to extend part way into the upper portion of the guideway where they may be contacted by the moving lugs 52, thus moving the pallet with its supported articles along the length of the guideway or as far as contact with the lug is maintained. The cable 16 is in turn moved along by reason of pressure of the forked pushers 38 against the rear face of successive cable blocks 48. Accordingly it will be seen that since the drive chain 36 has the pushers spaced only part way along its length, the cable blocks will be moved by them while the pushers are travelling along the upper portion of the chain circuit; but, on the other hand, when the pushers have moved down around the drive sprocket 26 and are passing along the under side of their path the cable will not be moved. Thus provision is made for conveying the pallet 10 to successive work stations, holding it stationary at each station for a predetermined time, and then moving it onward to a subsequent station where the sequence of movement may be repeated as often as required. This allows workmen to preform a required operation, lasting a particular length of time, upon the work piece 12 as it comes to their particular station. It will be apparent that variations in timing may be readily made by alteration of the number of either the contact hooks or lugs 52 (which need not be on every block) or by controlling the number of forked pushers 38 on the drive chain 36, as well as by variation in the length of the chain.

Figure 5:
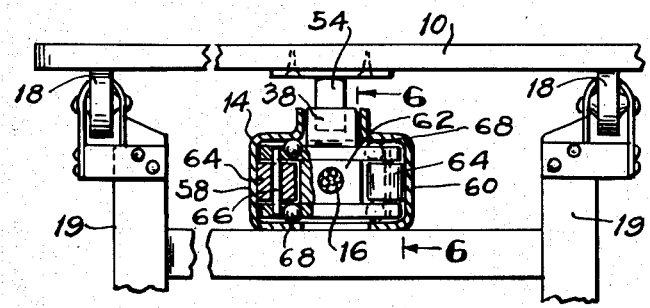
Figure 5 is a transverse, vertical, sectional view, partly in elevation, of a modified form of guideway and cable block of my conveyor system.
Figure 6:
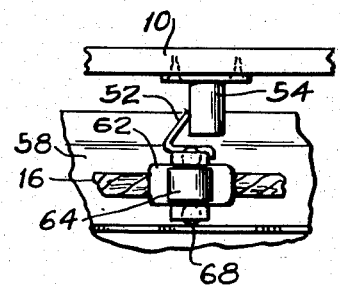
Figure 6 is a longitudinal, vertical, sectional view, partly in elevation, taken thru the modified construction of Figure 5.

In the modified form of guideway and block assembly shown in Figures 5 and 6, the side walls 58 and 60 of the guideway are shaped to receive between them a rectangular attachment block 62 fixed to the cable 16 similar to the block 48 of the prior embodiment. A roller bearing 64 is mounted on an upright pin 66 on either side of the block so that each roller contacts the adjacent, vertical face of the respective side wall 58 or 60 of the guideway. In addition, four ball bearings 68 are mounted in corresponding sockets of the block 62 so as to contact the upper and lower faces of the guide housing on opposite sides of the top and bottom slots or openings in the guideway.

The conveyor may readily be converted from intermittent action to a steady action by placing additional elements on the drive chain, not shown.

Figure 7:
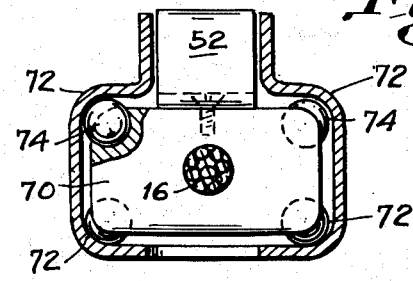
Figure 7 is a transverse, vertical, sectional view taken thru still another modification of cable block of my conveyor system.
Figure 9:
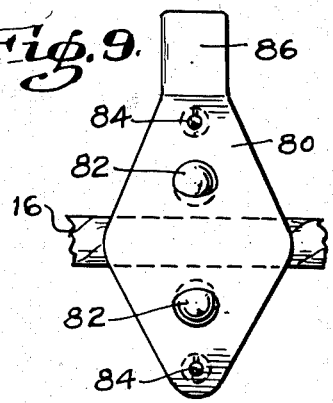
Figure 9 is a side elevational view of the cable block of Figure 8 as seen along the line 9—9.

In the modification illustrated in Figure 7 the opposite guide walls are again formed to jointly support a cable block 70, the inner faces of the four corners 72 of the guideway being radiused to correspond to the curvature of ball bearings 74 seated in corresponding sockets in corners of the block 70 so as to roll along the surfaces 72 of the guideway.

Figure 8:
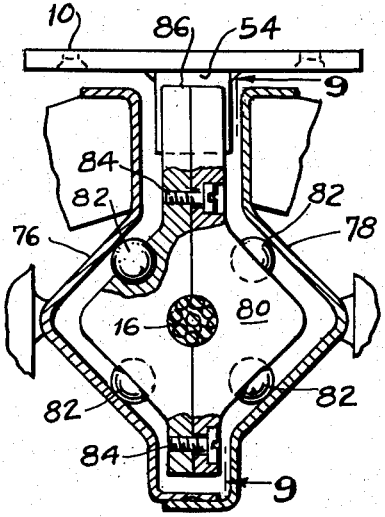
Figure 8 is a similar view thru yet another modified form of guideway and cable block.

In the modification illustrated in Figure 8, the side walls 76 and 78, below their upper neck portions, are bent outward and then back at a right angle so as to receive jointly between them a cable block 80 having a ball bearing 82 seated in a corresponding socket of each side face so as to roll along the channel formed by the oppositely bent side walls 76 and 78 and center the block therein. The block 80 may conveniently be made in two pieces so as to be fastened together securely about the cable 16 by screws 84, and the upper segment 86 disposed to contact the pallet pin 54 may or may not be formed integral with the block.

Figure 10:
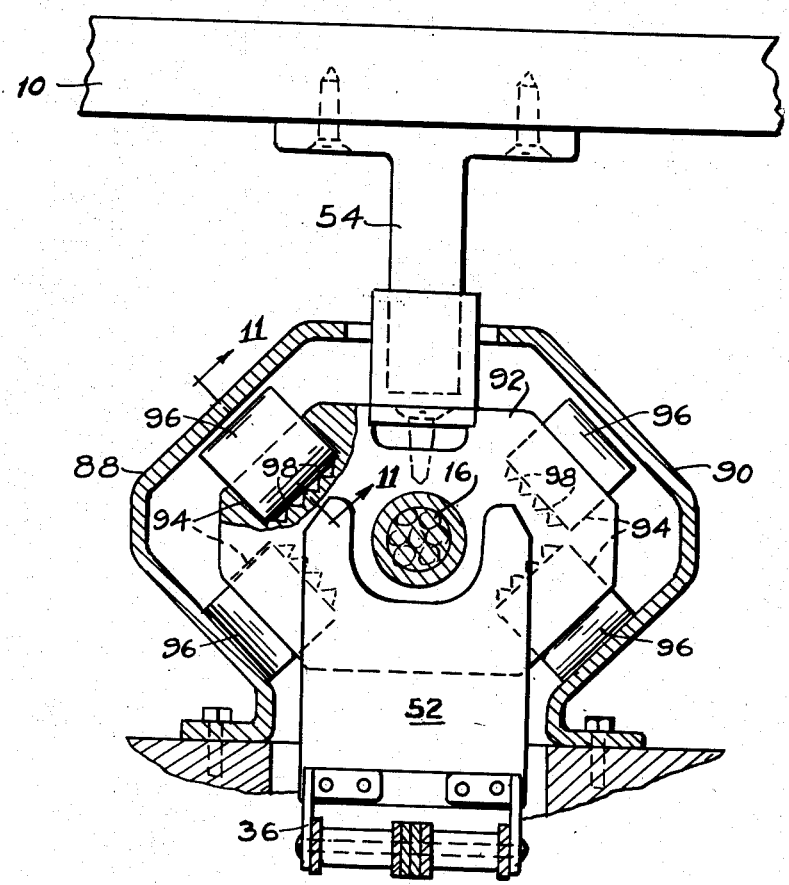
Figure 10 is a vertical, sectional view thru a further modified form of guideway and cable block of my conveyor system wherein the cable block is provided with grooved seats for the rollers disposed within the guide channel.
Figure 11:
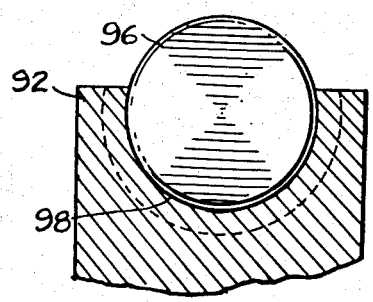
Figure 11 is a transverse, sectional view taken thru one of the rollers of Figure 10 along the line 11—11.

In the modification illustrated in Figures 10 and 11, each side wall 88 and 90 of the guideway is formed of slanted flat surfaces disposed substantially at right angles to each other, the two walls being oppositely facing so as to receive jointly therebetween a cable block 92, polygonal in cross section and provided with four sockets 94 in each of which are loosely fitted, without mounting pins, a cylindrical roller 96. The curved face of each socket is provided with a series of longitudinal parallel ridges 98, the points of which are thus disposed parallel with its direction of rotation to engage the moving surface of the roller, thereby reducing its contact surface area.

Figure 12:
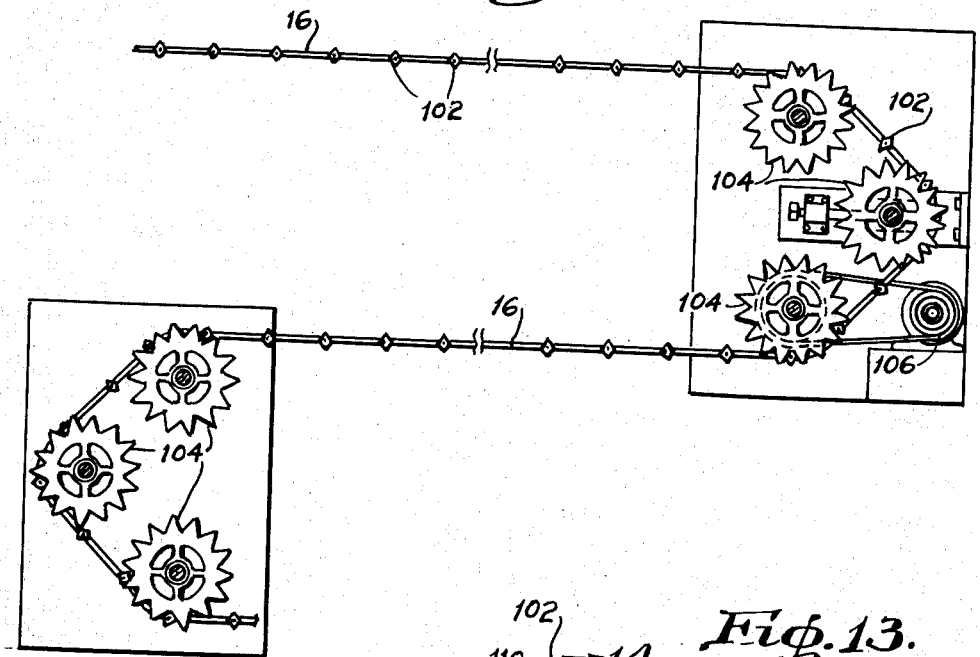
Figure 12 is a top, plan view of yet another embodiment wherein sprocket wheels are provided to move the cable in a tortuous path and particularly about sharp turns, the cable being provided with modified cable blocks adapted for use with the sprocket wheels.
Figure 13:
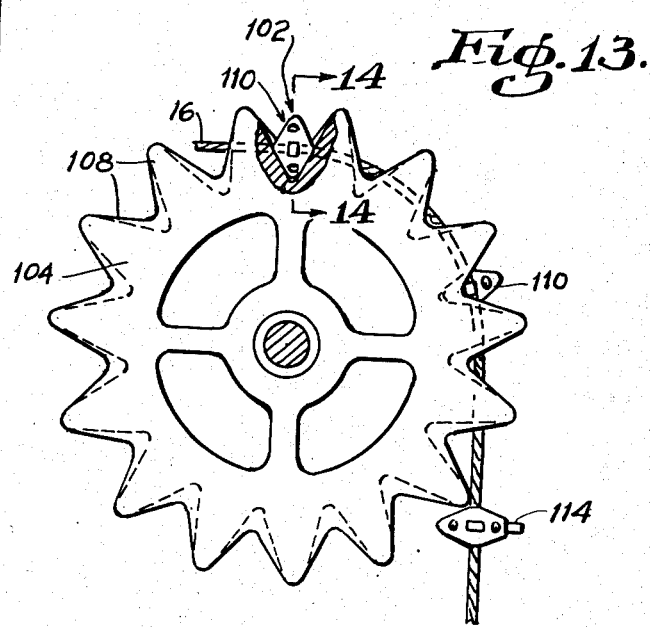
Figure 13 is an enlarged plan view of a sprocket wheel with parts broken away and particularly showing its engagement with the corresponding cable block.
Figure 14:
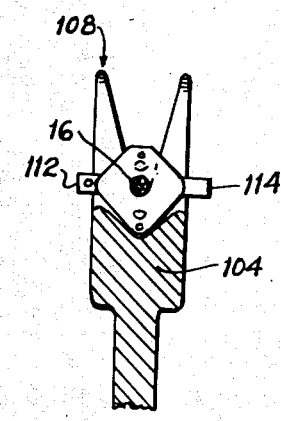
Figure 14 is a vertical, sectional view thru the cable block engaged by the sprocket wheel, taken along the line 14—14 of Figure 13.

In the embodiment illustrated in Figures 12 and 14, the cable 16 with its fixed blocks 102 are not disposed in the guideway but their path is determined by location of horizontally disposed sprocket wheels 104, one or more of which is positively driven as by a motor 106. The individual teeth 108 of the several sprocket wheels are horizontally or circumferentially bifurcate, that is, the forked ends are vertically spaced apart, so as to receive the cable 16 therebetween. The cable block 110 designed for use with such drive sprockets is substantially diamond shaped and is provided with an oppositely aligned pair of projecting lugs 112 and 114 which are disposed perpendicular to the split teeth 108 so as to seat the block between adjacent teeth. In addition, the projecting lug 114 serves to contact the dependent pin 54 on the bottom of the pallet similar to the lugs 52 and 86 in the prior embodiments. The particular advantage of the instant modification is that it provides a positive drive for taking the conveyor around sharp turns or for even reversing its direction completely in a short space.

In the embodiment illustrated in the Figures 15 to 17, the opposite side walls 120 and 122 are substantially U-shaped with their open portions facing each other. The cable blocks 124 each have mounted thereon a pair of wheels or rollers 126, pairs on alternate blocks being disposed to roll along the vertical or horizontal walls of the guideway as the case may be. This arrangement is also particularly adapted for changes in curvature in the guideway, either vertically or horizontally. As before, the blocks are provided with pallet engaging lugs 52 and are moved in turn by a forked pusher 38.

Accordingly, it will be seen that I have provided a highly effective and easily operable conveyor system which can be readily adapted to a great variety of uses with diverse processes and materials being worked on.

While I have shown and described in some detail presently preferred embodiments of my conveyor system, it is to be understood that various modifications may be made in the construction and operation thereof within the spirit and scope of the subsequently claimed invention which is to be construed broadly and limited only by the prior art.

I claim:

1. A conveyor system comprising, in combination: a longitudinal guideway; elongated, flexible power transmission means disposed in said guideway and movable therealong; a series of guide elements affixed to said means and spaced apart along the length thereof; rotatable bearing elements disposed between said guide elements and the guideway so as to reduce friction between the same; an endless flexible drive means disposed parallel to said means partway along its length; spaced engaging elements distributed along only a portion of the length of said drive means and adapted upon movement of said drive means to move said means by contact with said guide elements during part of the cycle of movement of said drive means and to leave said means at rest during another portion of said cycle of movement; and motor means adapted to continuously move said drive means.

2. A conveyor system comprising, in combination: a longitudinal guideway; elongated, flexible power transmission means disposed in said guideway and movable therealong; a longitudinally movable supporting structure disposed adjacent said guideway and movable by said elongated, flexible power transmission means; a series of recessed guide elements affixed to said means and spaced apart along the length thereof; rotatable bearing elements disposed in said recesses so as to bear against the guideway and to facilitate movement of the guide elements therealong; and means for imparting movement to said power transmission means.

3. The system of claim 2 wherein said guide elements are centered within the guideway by means of ball bearings disposed in the recesses in said guide elements to separate the side faces of the guide element and the adjacent walls of the guideway.

4. The system of claim 2 wherein said guide elements are centered within the guideway by means of cylindrical roller bearings disposed in the recesses in said guide elements to separate the side faces of the guide element and the adjacent walls of the guideway, said recesses having grooves running circumferentially with respect to said roller bearings.

5. A conveyor system comprising, in combination: a longitudinal guideway; a cable disposed in said guideway and movable therealong; a longitudinally movable supporting structure disposed adjacent said guideway and movable by said cable; a series of guide elements affixed to said cable and spaced apart along the length thereof, each guide element being individually provided with a single pair of laterally spaced wheels adapted to roll along opposite walls of said guideway, the wheels of successive separate elements being disposed substantially at right angles to each other; an endless belt disposed parallel to said cable partway along its length; engaging elements spaced part way along said belt and adapted upon movement of said belt to intermittently move said cable by contact with said guide elements; and drive means adapted to continuously move said belt.

6. A conveyor system comprising, in combination a guideway having a longitudinal slot along the top thereof; a longitudinally movable supporting structure having dependent engageable means disposed adjacent said slot; roller means adapted to support said structure laterally of said guideway; elongated, flexible power transmission means disposed in said guideway and movable therealong; a series of recessed guide elements affixed to said means and spaced apart along the length thereof; means intermediate individual guide elements and said engageable means to transmit drive from said individual guide elements to said engageable means; rotatable bearing elements disposed in said recesses so as to bear against the guideway and to facilitate movement of the guide elements therealong; and drive means for imparting movement to said power transmission means.

7. A conveyor system comprising, in combination: a guideway having a longitudinal slot along the top thereof; a longitudinally movable supporting structure having dependent engageable means disposed adjacent said slot; roller means adapted to support said structure laterally of said guideway; a cable disposed in said guideway and movable therealong; a series of recessed guide elements affixed to said cable and spaced apart along the length thereof; means intermediate individual guide elements and said engageable means to transmit drive from said individual guide elements to said engageable means; rotatable bearing elements disposed in said recesses so to bear against the guideway and to facilitate movement of the guide elements therealong; and continuously moving drive means adapted to intermittently move said cable whereby said supporting structure is conveyed to successive stations with rest periods at each.

8. A conveyor system according to claim 2, said guideway having a plurality of flat guiding surfaces each disposed at an angle between vertical and horizontal, said recesses being located in portions of said guide elements adjacent to said guiding surfaces so as to cause said bearing elements to contact said guiding surfaces when said guide elements are positioned in said guideway.

9. A conveyor system according to claim 2, said guideway having a plurality of flat guiding surfaces each disposed at an angle between vertical and horizontal, said recesses being located in portions of said guide elements adjacent to said guiding surfaces so as to cause said bearing elements to contact said guiding surfaces when said guide elements are positioned in said guideway, said bearing elements being cylindrical roller bearings, said recesses having grooves running circumferentially with respect to said roller bearings.

10. A conveyor system according to claim 2, said guideway being bulged outwardly on each side to provide longitudinally extending grooves of semicircular section, said bearing elements being balls, a ball being located on each side of the power transmission means and riding in said grooves.

11. A conveyor system according to claim 2, said guideway being generally rectangular in cross section with rounded corners, said guide elements being of similar cross section with said bearing elements comprising balls located at the four corners of the elements and bearing against said rounded corners.

12. In a conveyor, the combination of a guideway having a plurality of flat guiding surfaces, the uppermost and the lowermost of said surfaces being disposed at an angle between vertical and horizontal, elongated flexible power transmission means movably disposed in said guideway, at least one motion transmitting element movable in said guideway by said transmission means, and friction reducing means in said guideway between said element and said angularly disposed guiding surfaces.

13. In a conveyor, the combination of a guideway having a plurality of flat guiding surfaces, the uppermost and the lowermost of said surfaces being disposed at an angle between vertical and horizontal, elongated flexible power transmission means movably disposed in said guideway, at least one motion transmitting element movable in said guideway by said transmission means, and rotatable bearing means disposed between said element and said angularly disposed surfaces.

14. In a conveyor, the combination of a guideway having a plurality of flat guiding surfaces, the uppermost and the lowermost of said surfaces being disposed at an angle between vertical and horizontal, elongated flexible power transmission means movably disposed in said guideway, at least one motion transmitting element movable in said guideway by said transmission means, said element having recesses located in portions of said element adjacent said guiding surfaces, and rotatable bearing means located in said recesses for rotatable contact with said surfaces.

15. In a conveyor for moving articles, the combination of a guideway having a plurality of flat guiding walls disposed at an angle between vertical and horizontal and forming a slot extending along said guideway, elongated, flexible power transmission means movably disposed in said guideway, friction reducing means in said guideway between said element and said guiding walls, and at least one motion transmitting element movable in said guideway by said transmission means for transmitting motion through said slot from said cable to the articles being moved.

ALBERT R. DE BURGH.

References Cited in the file of this patent

UNITED STATES PATENTS

| Number | Name | Date |
|--------|------|------|
| 399,063 | McBride et al. | Mar. 5, 1889 |
| 1,377,800 | Brown | May 10, 1921 |
| 1,804,143 | Birdsall | May 5, 1931 |
| 1,949,691 | Neher | Mar. 6, 1934 |
| 1,973,005 | Lemmon | Sept. 11, 1934 |
| 1,973,750 | De Kay | Sept. 18, 1934 |
| 2,281,305 | Hannon | Apr. 28, 1942 |
| 2,317,675 | De Burgh | Apr. 27, 1943 |